(No Model.) 2 Sheets—Sheet 2.
C. P. BROWN.
COMPENSATING AND STEERING GEAR FOR ROAD VEHICLES.
No. 434,624. Patented Aug. 19, 1890.
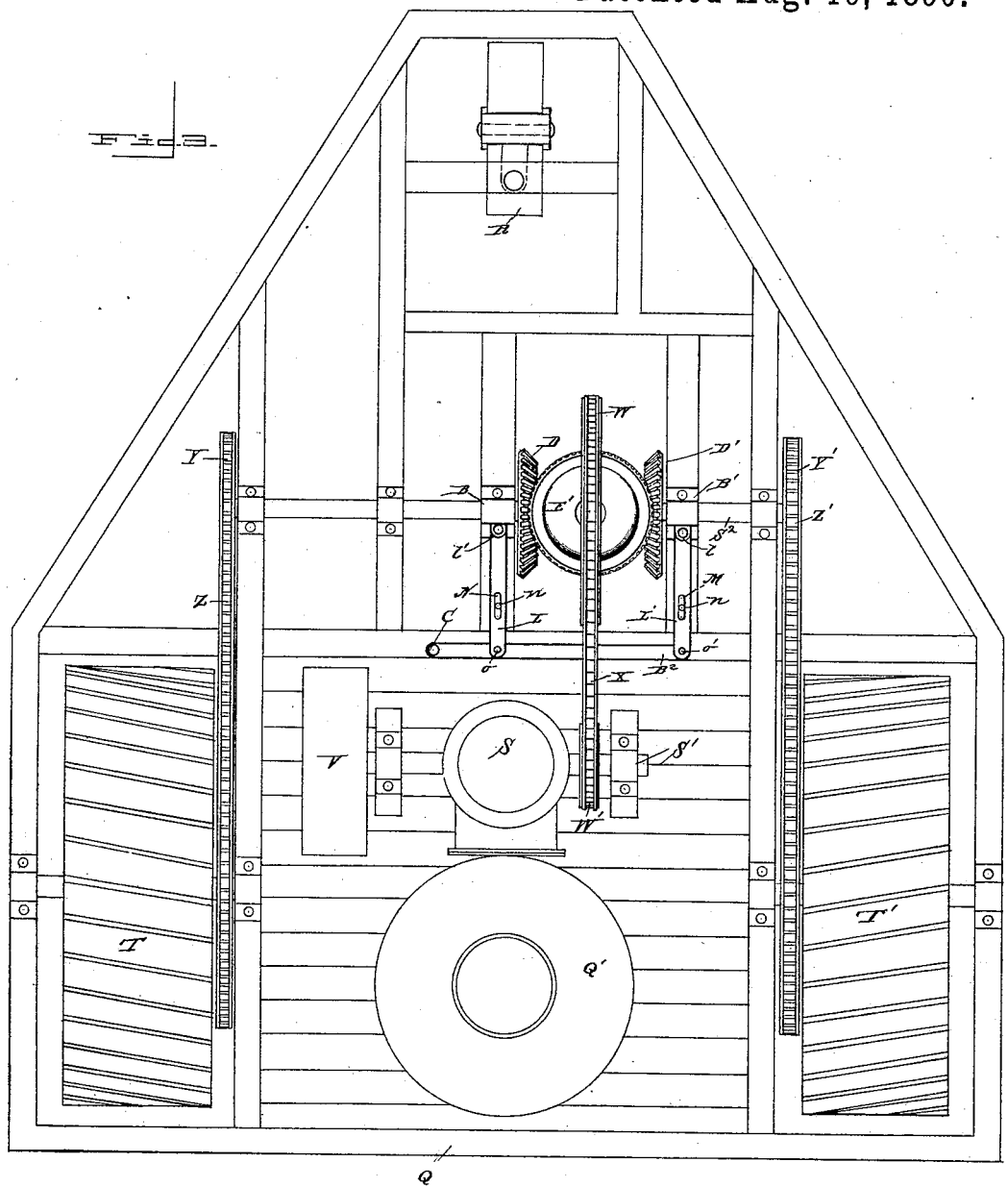

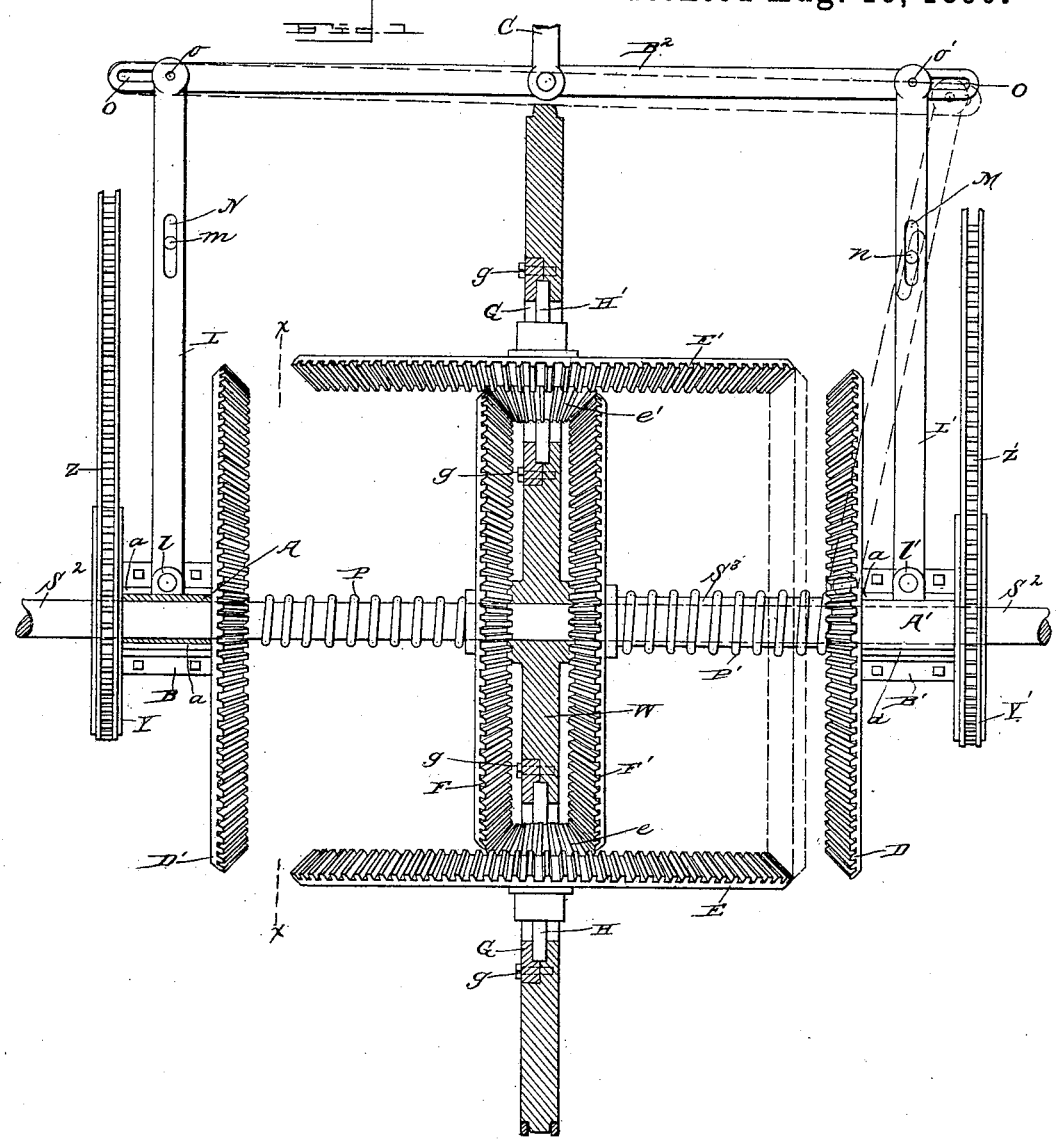

UNITED STATES PATENT OFFICE.

CORYDON P. BROWN, OF WINNIPEG, CANADA.

COMPENSATING AND STEERING GEAR FOR ROAD-VEHICLES.

SPECIFICATION forming part of Letters Patent No. 434,624, dated August 19, 1890.

Application filed April 12, 1890. Serial No. 347,645. (No model.)

*To all whom it may concern:*

Be it known that I, CORYDON P. BROWN, a subject of the Queen of England, residing at Winnipeg, in the county of Selkirk, Manitoba, and Dominion of Canada, have invented certain new and useful Improvements in Compensating and Steering Gears; and I do hereby declare the following to be a full, clear, and exact description of the invention, such as will enable others skilled in the art to which it appertains to make and use the same.

My invention consists in the combined compensating and steering gear hereinafter to be more fully described and claimed.

In the drawings, Figure 1 represents a detail plan view, partly in section, of my improved gear. Fig. 2 is a detail side view of the driving-wheel. Fig. 3 is a plan view of a locomotive-vehicle with my gear attached.

In many forms of self-propelling vehicles of heavy construction—such, for instance, as in various kinds of agricultural machinery—the problem of steering the same and of arranging to permit of the necessarily unequal actions of the heavy driving-wheels when the machine is turning corners becomes a difficult one. Various kinds of compensating-gear to accomplish the latter result have been employed, and the difficulties encountered in turning the machine somewhat reduced thereby; but even then the plan of steering by means of a caster-wheel has required cumbersome apparatus, and because of the side draft of said caster-wheel when turned at any considerable angle the forward motion of the machine is apt to be retarded and the field badly torn up. To overcome these difficulties and to unite in one gear the compensating and steering actions I have designed the construction herein illustrated and described, in which—

Q represents the frame of any vehicle—such, for instance, as a locomotive steam-plow—on which is mounted the boiler Q', supplying steam to the engine S, which has the crank-shaft S' and fly-wheel V. On the shaft S' is mounted the sprocket-wheel W', over which the sprocket-chain X runs, transmitting motion to the sprocket-wheel W, which is the driving-wheel of the combined compensating and steering gear. The frame Q is mounted on the independently-rotating traction and carrying-wheels T T' and the swiveled caster-wheel R. The traction-wheels T T' are caused to rotate by the sprocket-chains Z Z', which run over the sprocket-wheels Y Y', which are driven at varying rates of speed, according to the direction in which the plow is being steered and according to the inequalities of action between the traction-wheels.

My improved gear is most clearly shown in Fig. 1. The driving-wheel W is loosely mounted and revolves on the shaft $S^2$. Upon said shaft is keyed one of the driven beveled gears F. A sleeve $S^3$ on said shaft carries the second driven beveled gear F', and is keyed thereto. The sprocket-wheel Y is keyed to the shaft $S^2$, while the sprocket-wheel Y' is keyed to the sleeve $S^3$. It is evident, therefore, that the motion of the two driven wheels F F', which rotate independently, one of the other will control the motion of the independently-rotating traction-wheels T T'. Rotation is given to said driven bevel-gears by means of the beveled pinions e e', which mesh therewith and which are mounted on axes disposed radially in the driving-wheel W. Said axes are lettered H H' in Fig. 1, and carry also the secondary beveled pinions E E'. The pinions e E are fastened rigidly, so that they revolve together. The same is true of the beveled pinions e' E'. The axes H H' and the pinions keyed thereon may be removed by taking away the plate G, held in place by the bolts g. Other bevel-gears D D' are provided and designed so that either may mesh simultaneously with the secondary pinions E E'. Each of these gears D D' is so mounted that it cannot rotate, but is capable of endwise motion along its axis, so as to throw it into and out of mesh with the secondary pinions E E'. This capacity for endwise motion may be brought about in any one of the large number of ways. In the construction illustrated each of the gears D D' is mounted on a sleeve A A', which sleeves rest in bearings B B'. These sleeves have feathers or splines a, which fit into keyways or grooves in the bearings B B' and prevent all rotation of the gears D D', while at the same time permitting the sliding motion along the axis above described. Spiral springs P P' or their equivalents act to hold the gears D D' normally out of mesh with the secondary pinions E E'.

In order to put the operator in control of the gear, levers L L', pivoted to lugs $l\ l'$ on the sleeves A A' may be employed. In Fig. 1 I have shown such levers pivoted on pins $m\ n$, passing through slots M M in said levers. The levers are connected by the link B², so that they may both be operated from the same lever or handle C. The levers are shown connected to the link by means of the pins $o\ o'$ and slots O O' in Fig. 1, so that one of the levers, as L', may be moved into the position indicated by dotted lines without disturbing the other lever. In Fig. 3 the connection between the levers and the link is devoid of this slotted arrangement, the only difference in the action being that here when one of the non-rotating gears D is moved up into mesh with the pinions E E' the other is moved away still farther, instead of being left quiet, as is the case with the arrangement shown in Fig. 1. The arrangement shown in Fig. 3 has the advantage that by no possibility can the two non-rotating gears D D' both be thrown into mesh at the same time, thereby breaking the gearing.

The method of operation and the various advantages of my invention are evident. When the steering-handle C is left in mid-position both the non-rotating gears D D' are out of mesh, and the rest of the mechanism acts simply as a compensating-gear. The revolutions of the driving-wheel W are transmitted equally to the driven beveled gears F F', and if the resistances met by the two traction-wheels are equal they rotate at equal speeds, while if any inequalities of action become necessary the compensating-gear adapts itself thereto in the well-known way, allowing one or the other of the gears F F' to go faster or slower, as the occasion may require.

When it is desired to turn the vehicle to one side the steering-handle C is pushed in that direction. The result of this is to throw one of the non-rotating gears, as D, into the position shown in dotted lines in Fig. 1. The secondary pinions E E' are then compelled to roll on this stationary gear, and the result is that the driven gear F' is slowed down, while its companion gear F is slightly accelerated. In consequence one of the traction-wheels T runs a little in advance of its normal speed, while the other runs a little behind said speed, and the vehicle Q is turned to one side or the other, the caster-wheel R adapting itself to this motion. The direction of motion of the vehicle is therefore controlled by the operator with the expenditure of but little strength and without the absorption of any of the motive-power in dragging a steering-wheel sidewise through the soft dirt.

Having therefore described my invention, what I claim as new, and desire to secure by Letters Patent, is—

1. In a combined steering and compensating driving-gear, the combination of the two independently-rotating beveled driven gears, the beveled pinions gearing therewith and mounted on axes arranged radially in the driving-wheel, secondary beveled pinions of larger diameter than the first mounted on the same axes with the first-mentioned beveled pinions and rigid therewith, the driving-wheel, and the non-rotating bevel-gears placed on opposite sides of the secondary pinions and capable of being slid along their axes to engage with said secondary pinions, substantially as described.

2. In a combined steering and compensating driving-gear, the combination of the two independently-rotating beveled driven gears, the beveled pinions gearing therewith and mounted on axes arranged radially in the driving-wheel, secondary beveled pinions of larger diameter than the first mounted on the same axes with the first-mentioned beveled pinions and rigid therewith, the driving-wheel, and the non-rotating beveled gears placed on opposite sides of the secondary pinions and capable of being slid along their axes to engage with secondary pinions, together with the springs for normally holding said non-rotating gears out of engagement with the secondary pinions, substantially as described.

3. In a combined steering and compensating driving-gear, the combination of the two independently-rotating beveled driven gears, the beveled pinions gearing therewith and mounted on axes arranged radially in the driving-wheel, secondary beveled pinions of larger diameter than the first mounted on the same axes with the first-mentioned beveled pinions and rigid therewith, the driving-wheel, and the non-rotating beveled gears placed on opposite sides of the secondary pinions and capable of being slid along their axes to engage with said secondary pinions, together with the springs for normally holding said non-rotating gears out of engagement with the secondary pinions, levers, and connecting apparatus for alternately throwing the non-rotating gears into mesh with the said pinions, substantially as described.

4. In a combined steering and compensating driving-gear, the combination of the two independently-rotating beveled driven gears, the beveled pinions gearing therewith and mounted on axes arranged radially in the driving-wheel, secondary beveled pinions of larger diameter than the first mounted on the same axes with the first-mentioned beveled pinions and rigid therewith, the driving-wheel, and the non-rotating beveled gears placed on opposite sides of the secondary pinions and capable of being slid along their axes to engage with said secondary pinions, together with the springs for normally holding said non-rotating gears out of engagement with the secondary pinions, levers which reciprocate the non-rotating gears into and out of mesh with the secondary pinions, and the connecting-link pivoted to the levers, whereby the pinions may mesh with only one gear at the same time, substantially as described.

5. In a combined steering and compensating driving-gear, the combination of the two independently-rotating beveled driven gears, the beveled pinions gearing therewith and mounted on axes arranged radially in the driving-wheel, secondary beveled pinions of larger diameter than the first mounted on the same axes with the first-mentioned beveled pinions and rigid therewith, the driving-wheel, and the non-rotating bevel-gears placed on opposite sides of the secondary pinions and capable of being slid along their axes to engage with said secondary pinions, together with the independently-rotating traction-wheels, connecting mechanism extending from each of said driven bevel-gears to one of said traction-wheels, the vehicle-frame, and the caster-wheel swiveled in said frame, substantially as described.

6. In a combined steering and compensating driving-gear, the combination of the two independently-rotating beveled driven gears, the beveled pinions gearing therewith and mounted on axes arranged radially in the driving-wheel, secondary beveled pinions of larger diameter than the first mounted on the same axes with the first-mentioned beveled pinions and rigid therewith, the driving-wheel, and the non-rotating bevel-gears placed on opposite sides of the secondary pinions and capable of being slid along their axes to engage with said secondary pinions, together with the vehicle-frame, the independently-rotating traction-wheels, the bearings on the frame, feathered sleeves supporting the non-rotating gears sliding in said bearings, the rotating shaft and sleeve carrying the driven gears rotating in feathered sleeves, and connecting-gearing extending from said rotating shaft and sleeve to the traction-wheels, substantially as described.

In testimony whereof I affix my signature in presence of two witnesses.

CORYDON P. BROWN.

Witnesses:
A. McLEOD,
J. A. M. AIKINS.